United States Patent [19]

Stolper et al.

[11] Patent Number: 4,664,442
[45] Date of Patent: May 12, 1987

[54] SEAT ADJUSTER WITH INERTIA LOCK

[75] Inventors: Richard Stolper, Ginsheim-Gustavsburg; Theo Adler, Bensheim, both of Fed. Rep. of Germany

[73] Assignee: General Motors Corporation, Detroit, Mich.

[21] Appl. No.: 800,717

[22] Filed: Nov. 22, 1985

[30] Foreign Application Priority Data

May 25, 1985 [DE] Fed. Rep. of Germany ....... 3518949

[51] Int. Cl.4 .............................................. B60N 1/08
[52] U.S. Cl. .................................... 297/216; 297/480
[58] Field of Search ............... 297/216, 344, 478, 480; 248/424, 429, 430

[56] References Cited

U.S. PATENT DOCUMENTS

| 1,964,405 | 6/1934 | Nenne | 297/344 X |
| 2,307,305 | 1/1943 | Saunders et al. | 297/344 X |
| 3,189,313 | 6/1965 | Burns et al. | 248/429 |
| 3,711,056 | 1/1973 | Gmeiner et al. | 248/429 |
| 3,897,101 | 7/1974 | Hess | 297/216 X |

FOREIGN PATENT DOCUMENTS

| 2700474 | 7/1978 | Fed. Rep. of Germany | 297/216 |
| 2940463 | 4/1980 | Fed. Rep. of Germany | . |
| 2940935 | 10/1982 | Fed. Rep. of Germany | . |
| 65925 | 5/1979 | Japan | 297/216 |
| 475554 | 11/1937 | United Kingdom | 248/429 |

Primary Examiner—Kenneth J. Dorner
Assistant Examiner—Peter R. Brown
Attorney, Agent, or Firm—Charles E. Leahy

[57] ABSTRACT

A motor vehicle seat is guided, as is customary, with its upper tracks in lower tracks and is manually adjustable and lockable into selected longitudinally spaced seat positions. In addition to these seat position locking means, the seat is provided with at least one deceleration activated locking device which, under conditions of relatively high deceleration, will effect form-locking engagement between the upper track and the lower track.

1 Claim, 5 Drawing Figures

U.S. Patent May 12, 1987 4,664,442
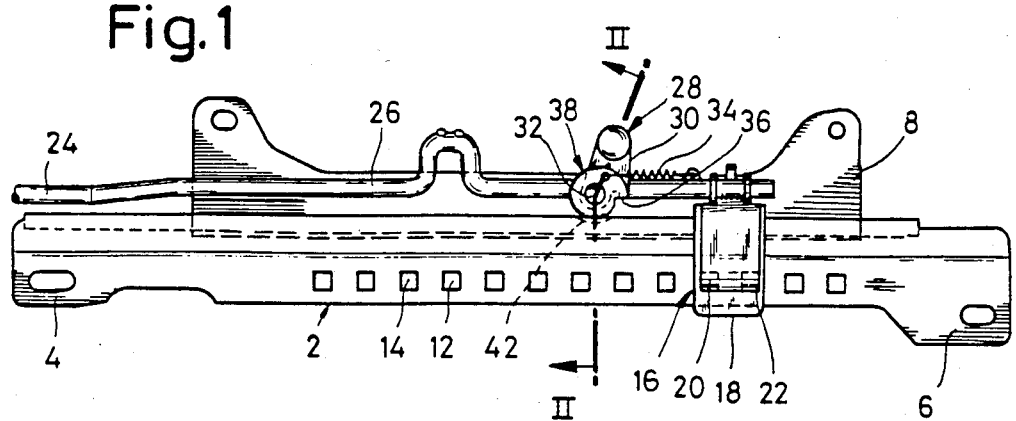
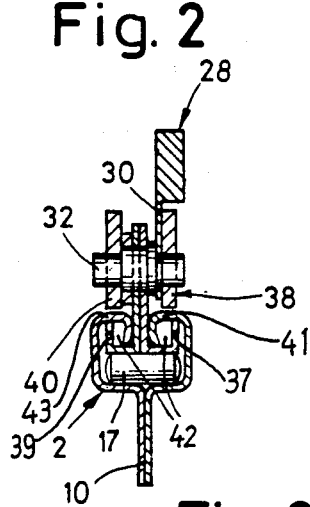
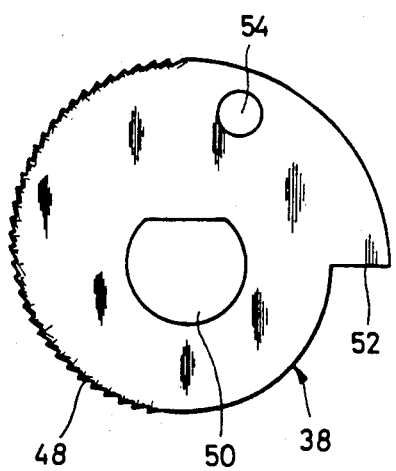
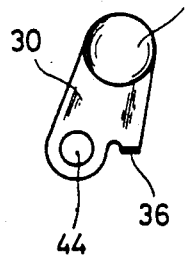
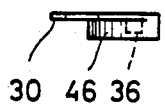

SEAT ADJUSTER WITH INERTIA LOCK

The invention relates to a motor vehicle seat which is guided for longitudinal sliding movement on at least one lower stationary track, and which is provided with a releasable locking mechanism for locking the vehicle seat, by means of a handle, longitudinally in selectable positions.

BACKGROUND OF THE INVENTION

Since it is imperative that the seats in motor vehicles not be slideable in the event of a collision, the longitudinally adjustable seat is provided with a locking mechanism, wherein a pawl engages into an aperture provided on the lower track when the seat is in the locked position. The motor vehicle seat can be locked in various positions, because the lower track has several such apertures arranged therealong which can be selectively used for locking the seat into position.

If after releasing the handle of the longitudinal adjusting mechanism, the pawl of the seat locking mechanism happens to be positioned between two such spaced apart apertures, the pawl is temporarily unable to snap into latching engagement. In these instances, seat locking will usually occur during subsequent vehicle braking as a result of inertia induced forward seat displacement.

SUMMARY OF THE INVENTION

It is the object of the invention to incorporate features into a motor vehicle seat of the type described in the foregoing that will ensure that the seat, in the event of an accident, is automatically locked into position even if seat locking did not occur after a longitudinal seat adjusting movement.

In accordance with the invention, this object is accomplished in that a supplementary, inertia activated automatic locking device is provided which is able to lock the seat in the direction in which the seat slides.

It is common to employ inertia-operated locking devices in motor vehicle seat belt retracting mechanisms. These inertia locking devices permit the seat belt to be slowly withdrawn from the retractor reel by the seated occupant, but in the event of an accident, the seat belt is firmly retained to protect the seat belt wearer.

German patent DE-PS No. 962 574 already disclosed a motor vehicle seat with a foldable seat back which is provided with an inertia actuated locking device. Normally, the seat back can always be tilted forwardly, especially the vehicle. However, in the event of an inertia condition, the seat back of the front seat is locked into position, so that the rear seat occupants cannot push against the seat back of the front seat and thereby displace the front seat occupants in a forward direction.

No effort has been made in the past to provide motor vehicles with inertia actuated seat locking devices to enable seat locking in the longitudinal direction because vehicle seats must be locked in position even if no unusual deceleration occurs, especially during normal vehicle braking. The arrangement according to the invention, which encompasses the combination of a longitudinal seat locking mechanism and an inertia actuated seat locking device provides that the vehicle seat can be adjusted and reliably locked, as usual, in a number of predetermined longitudinal positions. However, if a vehicle occupant, after a longitudinal seat adjustment, forgets to ascertain that the seat is locked into position, the seat can not be displaced longitudinally because it will be locked into position, independently from its respective longitudinal position, by the inertia locking mechanism which is actuated in response to the high deceleration forces.

As a general rule, the high forces generated are acting in a forward direction. But in some instances, and especially when the vehicle is struck from the rear, the forces are acting in the rearward direction. If one wants to ensure that in this instance, too, the front seat, if it is not locked into position subsequent to longitudinal adjustment, is not displaced longitudinally, it is preferable that, in accordance with the invention, features be incorporated in the inertia actuated locking mechanism that provide automatic locking of the front seat in response to rearwardly as well as forwardly acting deceleration forces.

The locking arrangement according to the invention is relatively simple in design and therefore reliable in operation and economical to manufacture. A particular simple arrangement is one wherein the locking mechanism includes a slideable pendulum member which is mounted to the vehicle seat and is rigidly coupled with a latching element. The latching element is adapted for inertia induced pivoting movement from a normal position into a latching position wherein it is in engagement with the lower seat track.

According to one feature of the invention, the latching member of the locking mechanism is in the form of an eccentric disk which is provided on a portion of its circumferential surface area with saw-like toothing, and which in the latching position is adapted for pivoting movement towards the lower track. A disk of this type is able to interlock in any given position with the lower track and to thereby block any movement of the front seat.

According to another feature of the invention, the locking device is arranged in an upper track which is guided in the lower track and which is affixed to the motor vehicle seat, and the upper track is provided with a recess into which the lower track, during conditions of high deceleration, is urged by the eccentric disk when said disk is in the latching position. This arrangement has the advantage that latching is achieved by form-locking engagement.

Load balancing of the locking device and the lower track can be achieved by relatively simple means in that the locking device has on either side of the upper track an eccentric disk, and in that one recess is provided on each side of the upper track.

Another advantageous arrangement is one wherein the pendulum is biased, by means of a rearwardly pulling tension spring, which has one of its ends connected to one eccentric disk and the other end to the upper track, into a normal position wherein the eccentric disks are out of engagement with the lower track. This arrangement will enable, by way of tension spring dimensioning, the locking device to be calibrated so as to determine at which deceleration values the pendulum and thus the locking mechanism will respond.

In accordance with one arrangement, the pendulum has a latching element on two sides and, depending on the direction in which the deceleration forces are acting, is pivoting from a neutral position either forwardly or rearwardly to lock the front seat. Another arrangement is one wherein a pair of locking devices are arranged in a mirror-image-like fashion so that one is functioning in a forward and the other in a rearward direction.

It should be appreciated that a variety of arrangements may be utilized in the practice of the invention. To convey the concept of the invention, one exemplary embodiment is illustrated in the drawing and described in the following specification.

BRIEF DESCRIPTION OF THE DRAWINGS

FIG. 1 is a side view of a motor vehicle seat guide means according to the invention.

FIG. 2 is a section along line 2—2 of FIG. 1 at an enlarged scale.

FIG. 3 is a pendulum of locking device of the guide means according to FIGS. 1 and 2.

FIG. 4 is a plan view of the pendulum according to FIG. 3.

FIG. 5 is an eccentric disk of the locking device which serves a latching element.

DESCRIPTION OF THE PREFERRED EMBODIMENT

FIG. 1 illustrates a lower track 2 with mounting ends 4 and 6 used for bolting the track, in a manner not illustrated in the drawing, to the sub-structure of the motor vehicle. The lower track 2 is guiding an upper track 8 which is rigidly attached to the base (not illustrated) of a motor vehicle seat.

As is apparent, especially from FIG. 2, the lower track 2 is comprised of an upwardly open box section and a downwardly extending flange 10. This flange has, as illustrated in FIG. 1, rectangular apertures which are denoted, for exemplary purposes, by the numerals 12 and 14. A plurality of rollers 17 are captured between the lower track 2 and the upper track 8 to mount the upper track for fore and aft sliding movement along the lower track. A locking device for longitudinal seat locking, which is rigidly connected with the upper track 8, is comprised of a bracket 18 which embraces the lower track 2 from above, and has two latching pawls 20 and 22 which are adapted to engage into apertures 12 and 14 and extend from one side of bracket 18 to the other side thereof. An unlatching bar 26, which is operable through handle 24, is adapted for pivoting movement so as to pivot the bracket 18 and cause the latching pawls 20 and 22 to be pivoted out of the apertures 12 and 14. The seat can then be displaced for effecting fore and aft adjustment. When the seat is adjusted to the new seating position and the pawls 20 and 22 are again lining up with two apertures 12 and 14, the pawls will snap into these apertures 12 and 14 so that the motor vehicle seat is locked into its new position.

The components described in the foregoing are conventional, but it should be appreciated that they may be of an entirely different configuration. The principal feature of the invention is a deceleration responsive locking device which is arranged on the upper track 8. This locking device is provided with a pendulum 30, which is arranged on the upper track 8 for pivoting movement about a pin 32, and which in the inoperative state assumes an upright position. A tension-type spring 34, which has one of its ends attached to the upper track 8 and the other end to a component connected with the pendulum or to the pendulum itself, urges the pendulum 30 in clockwise direction until a stop 36 of the pendulum engages the upper track 8.

The pendulum is affixed to two eccentric disks 38 and 40 in a non-rotatable relationship therewith. Each of these disks 38 and 40 forms with its circumferential surface a latching element. As apparent from FIGS. 1 and 2, the outer upwardly directed flanges 37 and 39 of the upper track 8 are provided in the area below the eccentric disks 38 and 40 with recesses 42 which are covered by inwardly directed arms 41 and 43 of the lower tracks 2. When subjected to high deceleration forces, the pendulum 30 will swing counter-clockwise. This will cause the eccentric disks 38, 40 to be seated on the upper side of the inwardly directed arms 41 and 43 of lower track 2, whereby said inwardly directed arms 41 and 43 of the lower track are pushed into engagement with the upwardly directed flanges 37 and 39 of the upper track 2 in the area of the recesses 42, so that a formlocking connection is established through which the upper track 8 is rigidly joined with the lower track 2.

FIGS. 3 and 4 illustrate in greater detail the configuration of the pendulum 30. One will recognize in FIG. 3 a hole 44 through which the pin 32, illustrated in the preceding figures, extends. The pendulum 30 is provided on its upper side with a cylindrical weight 46. In an area below the weight 46 and approximately at the level of the hole 44, the pendulum is provided with a stop 36 (see also FIG. 1), which is produced by bending a sheet metal blade.

FIG. 5 illustrates the eccentric disk 38 at an enlarged scale. One will notice that a portion of its circumference is provided with saw-like toothing 48. A hole 50, which is flattened on one side, is disposed off-center in the disk 38, and the pin 32 is extending through said hole 50. The pin 32 is provided with a corresponding flat, so that the eccentric disk 38 cannot move relative to pin 32. In the circumferential surface area opposite the toothing 48, the eccentric disc 38 has a shoulder 52 with which the stop 36 engages from underneath. When the pendulum 30 pivots in a counter-clockwise direction, it will drive the adjacent eccentric disk 38 counter-clockwise. The other eccentric disk 40 is turned in synchronism by way of the pin 32 because it, like the eccentric disk 38, has a hole 50 that is flattened on one side. As apparent from FIG. 5, the eccentric disk 38 also has a hole 54 into which one end of the spring 34 is hooked. If space permits, the eccentric disk 38 may be combined with the pendulum 30 so as to form a one-piece structure therewith.

The operation of the locking device is relatively simple. The locking device according to the invention is not being actuated as a result of normal deliberate seat adjustment movements. If the vehicle is subjected to extraordinary deceleration forces, the weight 46 on the pendulum 30 will cause the same to pivot in counter-clockwise direction. The toothing 48 on the eccentric disks 38 and 40 will then be urged onto the upper surface areas of the lower track 2. Due to the inertia forces, the toothing 48 will pierce and penetrate into the lower track 2 and thereby rigidly connect the upper track 8 with the lower track 2. Under conditions of extremely high deceleration, the eccentric disks 38 and 40 form depressions in the lower track 2 which extend into the recesses. This will cause a form-locking engagement to occur between the upper track 8 and the lower track 2. The deceleration value at which the pendulum 30 is intended to respond can be determined by the selection of the type of tension spring 34 and the position of the center of gravity of the pendulum 30.

It will be understood that the seat locking mechanism may include an additional locking mechanism including a second pendulum and eccentric disks which are arranged to lock the seat against an inertia condition in the opposite direction.

The embodiments of the invention in which an exclusive property or privilege is claimed are defined as follows:

1. A vehicle seat adjuster adapted for mounting a seat on a vehicle body for longitudinal sliding fore and aft adjustment comprising:

a lower track mounted on the vehicle body;

an upper track mounted on the seat;

means acting between the upper and lower tracks including roller means captured therebetween to facilitate low friction sliding movement therebetween and laterally spaced inwardly directed arms of the lower track overlying laterally spaced upwardly directed flanges of the upper track in closely spaced relation with one another to engage with one another to prevent the upper track from lifting upwardly off of the lower track;

manually releasable locking mechanism acting between the upper and lower tracks to releasably lock the seat a selected longitudinal adjusted position;

a pivot pin mounted on the upper track;

first and second eccentric disks mounted on the pivot pin on opposite sides of the upper track and respectively overlying the laterally spaced inwardly directed arms of the lower track, said eccentric disks having teeth thereon;

pendulum means mounted on the pin and adapted to rotate the eccentric disks in response to deceleration so that the teeth of the eccentric disks engage with the inwardly directed arms of the lower track to lock the upper track against sliding movement with respect to the lower track, and said engagement of the eccentric disks being further effective upon greater level of force acting thereon to deform the inwardly directed arms of the lower track into form-locking engagement with the upwardly directed flanges of the upper track to lock the upper track against sliding movement with respect to the lower track;

and spring means and stop means acting between the upper track and the pendulum and cooperating to normally maintain the first and second eccentric disks in spaced relation from the inwardly directed arms of the lower track whereby the locked position of the seat is normally determined solely by the manually releasable locking mechanism until the onset of a deceleration condition energizing the pendulum and eccentric disks to lock the position of the seat irrespective of the manually releasable locking mechanism.

* * * * *